Patented July 24, 1934

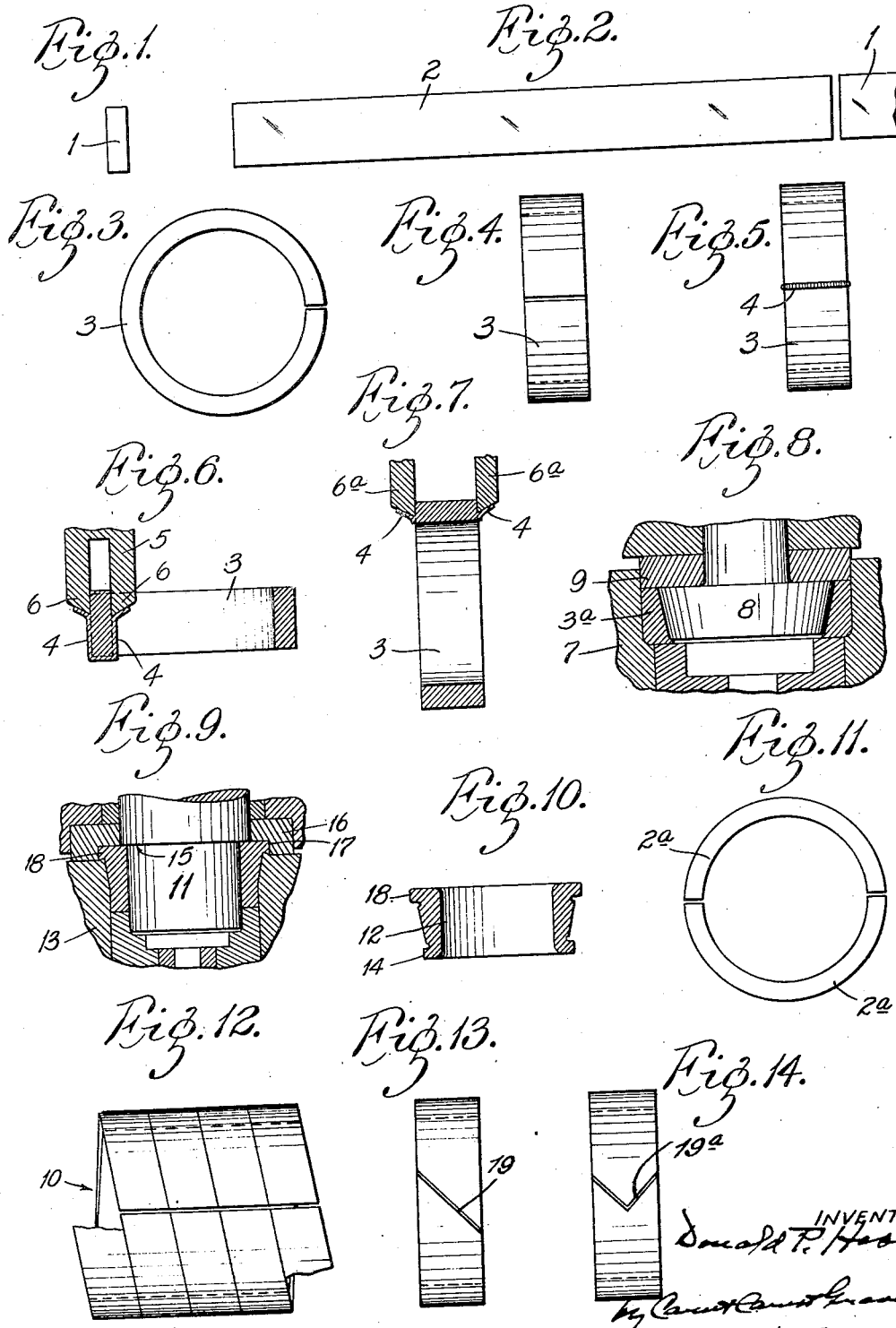

1,967,821

UNITED STATES PATENT OFFICE 1,967,821

PROCESS OF MAKING RACEWAY MEMBERS

Donald P. Hess, Canton, Ohio, assignor to The Timken Roller Bearing Company, Canton, Ohio, a corporation of Ohio Application February 17, 1932, Serial No. 593,431

6 Claims. (Cl. 29—148.4)

My invention relates to the manufacture of raceway members for roller bearings. Its principal objects are to minimize waste of expensive stock, to dispense with expensive machine operations, to effect divers economies and to produce products wherein the fibers of the metal are substantially parallel with the raceway surfaces. The invention consists in the process hereinafter described and claimed.

In the accompanying drawing, wherein like numerals refer to like parts wherever they occur:

Fig. 1 is an end view of the rectangular bar constituting the stock from which the raceway is formed;

Fig. 2 is a side elevation of said bar with a section cut therefrom,

Fig. 3 is an end view of a split ring formed by bending said section into circular form;

Fig. 4 is a side elevation of the ring shown in Fig. 3;

Fig. 5 is a view showing the ring with its ends buttwelded or flashwelded;

Fig. 6 is a vertical section illustrating the operation of removing the flash from the sides of the welded ring;

Fig. 7 is a vertical sectional view illustrating the operation of removing the flash from the ends of said ring;

Fig. 8 is a vertical sectional view showing the operation of changing the cylindrical ring or slug into the conical outer raceway member for a taper roller bearing;

Fig. 9 is a similar view showing the operation of changing the cylindrical ring or slug into a conical inner raceway member for a taper roller bearing;

Fig. 10 is a sectional view of the finished cone;

Fig. 11 is an end view of a ring made from two bar sections bent into semicircular form;

Fig. 12 is a view showing the initial strip coiled into a helix and slit longitudinally into a series of one-piece rings;

Fig. 13 is a side elevation of a ring or slug whose adjacent ends are disposed at an oblique angle to the ends thereof; and Fig. 14 is a similar view showing a ring or slug with V-shaped ends.

In the present invention, I prefer to use a cold rolled alloy steel of a composition commonly used for raceway members for roller bearings. Preferably the stock is in the form of a flat rod or strip 1 of substantially uniform thickness and width with its surfaces smooth and sound. From the end of such rod is cut off a length of section 2 substantially equal to the circumference of the raceway member to be formed therefrom. Such one-piece length or section 2 is bent into circular form with its ends pressing against each other and buttwelded. At this state of the process, the work is a cylindrical ring or "slug" 3 with a flash 4 at the weld and with the metal at and near the weld harder and of coarser grain structure than elsewhere.

The butt welded ring 3 is then heated to a semi-hot temperature, by which term is meant a temperature high enough to soften the metal of the weld and refine its structure, that is, decrease the size of its "grains" but not above the scaling temperature of the metal, that is, the temperature at which scale is formed on the surface of the metal to an appreciable extent. About 1000° to 1450° Fahrenheit is a suitable temperature for the alloy steel commonly used for making such raceway members.

The flash 4 is next removed from the welded ring 3. It is preferable to perform this operation while the ring is still semi-hot, as the metal is then much easier to cut. It is convenient to remove the flashes 4 by an operation in the nature of broaching, as indicated in Figs. 6 and 7. For removing the side flashes, the welded ring or slug 3 is centered opposite a longitudinally movable plunger 5 equipped with one or more cutter blades 6 in position to plane or shear off the inside and outside flashes 4 of the ring simultaneously or separately. The end flashes are similarly removed by cutters 6a.

The next operation after removing the flash is to change the cylindrical ring or slug 3 into a ring with one or both surfaces conical. When the cylindrical ring 3 is to be converted into a cup or outer raceway member 3a, it is placed in a substantially cylindrical coining die 7 adapted for cooperation with a tapered punch 8 which reciprocates concentrically with said die and whose conical surface is the same as that desired for the inner surface of the work. Said die is provided with a widened shoulder or collar 9 at the wide end of its conical surface. By this arrangement, the small end of the punch enters the bore of the ring or slug in the die while the shoulder of the punch presses against the end of such ring and upsets it against the tapered portion of the punch; that is, the pressure of the shoulder against the end of the ring shortens the ring and forces its metal to flow sidewise against the tapered portion of the punch as well as against the wall of the die. Preferably, this operation also is performed while the metal is hot enough to flow readily but not hot enough to form scale, the metal being preferably reheated to a temperature of about 1450° Fahrenheit for this operation.

After the die forming operation, the ends of the cup 3a are chamfered, the operation of chamfering being facilitated by the relatively soft condition of the metal produced by the previous heating.

The cup 3a is then case hardened and heat-treated in any suitable way; and if desired the cup may be ground also.

While I have described my process as applied to the formation of a roller bearing cup or outer raceway member from a single length or section of material, it obviously admits of modifications. For instance, as indicated in Fig. 11, instead of using a single length of stock, the work may be produced from two (or more) half lengths 2a buttwelded together at both ends. Likewise, as indicated in Fig. 12, it may be convenient to coil the initial strip into a helix 10 and slit such helix longitudinally into a series of one-piece rings; whose ends may be readily buttwelded.

Likewise it may be desirable to cut the adjacent ends of the ring along oblique angles thereof as shown in Figure 13; or the split ring may be provided with V-shaped ends as shown in Fig. 14.

Likewise, while I have described the process as applied to the formation of a cup or outer raceway member, it is readily applicable to the making of cones or inner raceway members, as indicated in Fig. 9. In such case, the front end of the punch 11 is of substantially cylindrical form and of the diameter desired for the bore of the finished cone or product 12. The narrowest portion of the die 13 is of cylindrical form and of substantially the same diameter as the circumferential rib 14 at the small end of the finished cone or product. From this small diameter of the cylindrical portion the wall of the die 13 flares or widens outwardly in conical form conformably to the race way surface of the finished cone. In this case, a shoulder 15 is formed at the end of the cylindrical portion of the punch 11; and the punch is provided with a collar 16 with an annular recess 17 in its inner corner, which recess extends outwardly beyond the inner edge of the die and has its radial wall substantially flush with the shoulder of the punch. By this arrangement, the work, namely, the hot cylindrical ring has one end (namely the end formed in said recess) considerably upset to form a circumferential rib 18 thereon. The other end portion of the work undergoes no substantial change of its cylindrical form and very little change of diameter; but the portion between the enlarged head or rib and such cylindrical portion is changed to a truly conical form of the size and taper required for the raceway of the finished work. As stated above, the portion of the die of cylindrical form is of substantially the diameter of the rib 14 required at the small end of the finished cone; and in order to complete the raceway thereof, it is necessary to remove the excess metal in the angle back of said rib that is, the conical portion is widened by turning the inner end part of the cylindrical portion to make a new conical surface flush and continuous with said first mentioned conical surface. The ribs at both ends of the conical raceway are then faced and undercut in accordance with usual practice, and the work or cone is then case hardened and heat-treated as above indicated.

One of the great advantages of the present process is that it arranges the fibers of the metal circumferentially of the raceways, as distinguished from the arrangement thereof lengthwise of the raceway, such as occurs when the raceways are made from tubing. The circumferential arrangement of the fibers minimizes the tendency to chipping and spalling. Another great advantage is that the process saves from 40 to 50 percent of the expensive alloy steel stock in comparison with the usual process of making similar raceway members from tubing by the use of screw machines. Besides, it is very economical of labor and reduces the cost of tool maintenance.

What I claim is:

1. The process of making annular raceway members which comprises forming a straight blank into circular form, welding the ends thereof together to form a continuous ring, heating said ring to a temperature below the scaling temperature thereof but high enough to refine the structure of the weld, planing off the welding flash while said ring is semi-hot and die forming said semi-hot ring into substantially the size and shape of the required raceway member.

2. The process of making raceway members for roller bearings which comprises forming a ring by bending and welding together the ends of the stock, heating said ring to refine the structure of the weld, planing off the flash produced by welding and die forming said ring to approximately the size and shape required for the raceway member, such refining, flash removing and die forming being done while the work is heated but to a temperature below the scaling temperature of the stock.

3. The process of making raceway members for roller bearings which comprises forming a ring by bending and buttwelding together the ends of the stock, refining the structure of the weld by heat, planing off the flash produced by welding by cutting longitudinally of the ring, and die forming said ring to approximately the size and shape required for the raceway member, such refining, flash removing, and die forming being done while the work is heated but to a temperature below the scaling temperature of the stock.

4. The process of manufacturing metal strips into roller bearing cones with ribs at both ends and a tapered raceway surface between said ribs, which process comprises forming the stock into a ring, butt-welding the ends thereof, removing the flash, and upsetting the welded ring in a coining die to produce an outer surface thereon of which one end portion is substantially cylindrical and of substantially the diameter of the rib at the small end of the cone, the other end portion is of substantially the diameter and width of the rib at the large end of the cone, and the portion between said end portions is of substantially the size and taper of the larger end part of the raceway surface of said cone.

5. The process of making cones for roller bearings from metal strips which comprises forming the stock into a ring, butt-welding the ends thereof, removing the flash, and upsetting the welded ring in a coining die to produce an outer surface thereon of which one end portion is substantially cylindrical and of substantially the diameter of the rib at the small end of the cone, the other end portion is of substantially the diameter and width of the rib at the large end of the cone, and the remaining portion is of substantially the size and taper of the larger end part of the raceway surface of said cone, the operations of removing the flash and upsetting being performed while the work has a temperature of about 1450° Fahrenheit.

6. The process of making cones for roller bearings from metal strips which comprises forming flat stock into a ring, butt-welding the ends thereof, removing the flash and upsetting the welded ring in a coining die to produce an outer surface thereon of which one end portion is substantially cylindrical and of substantially the diameter of the rib at the small end of the cone, the other end portion is of substantially the diameter and width of the rib at the large end of the cone, and the remaining portion is substantially the size and taper of the larger end part of the raceway surface of said cone, and then widening such tapered portion by removing the excess metal between the inner end of said cylindrical portion and the rib at the small end of the cone.

DONALD P. HESS.